United States Patent [19]

Saperstein et al.

[11] Patent Number: 4,688,311

[45] Date of Patent: Aug. 25, 1987

[54] METHOD OF MAKING A HEAT EXCHANGER

[75] Inventors: Z. Philip Saperstein, Gurnee, Ill.; Dean A. Arneson, Racine, Wis.; Scott R. Larrabee, Racine, Wis.; Jeffrey A. Logic, Racine, Wis.; Norman F. Costello, Racine, Wis.; Russell C. Awe, Brookfield, Wis.

[73] Assignee: Modine Manufacturing Company, Racine, Wis.

[21] Appl. No.: 887,223

[22] Filed: Jul. 21, 1986

Related U.S. Application Data

[63] Continuation-in-part of Ser. No. 835,637, Mar. 3, 1986, abandoned.

[51] Int. Cl.[4] .................. B21D 53/02; B23P 15/26
[52] U.S. Cl. ..................... 29/157.3 R; 29/157.3 A; 29/458; 228/183; 228/224
[58] Field of Search .................. 29/157.3 R, 157.3 B, 29/157.3 A, 157.4, 33 T, 33 G, DIG. 24, DIG. 25, 458; 228/183, 224, 173.4, 263.17, 254

[56] References Cited

U.S. PATENT DOCUMENTS 2,912,749  11/1959  Bauernfernd et al. ......... 29/157.3 R
3,920,069  11/1975  Mosier .
3,951,328   4/1976  Wallace et al. ...................... 148/26
4,392,362   7/1983  Little .

FOREIGN PATENT DOCUMENTS 198992   12/1982  Japan .
221390   12/1983  Japan .
2059562   4/1981  United Kingdom .
1601954  11/1981  United Kingdom .

Primary Examiner—Howard N. Goldberg
Assistant Examiner—Irene G. Golabi
Attorney, Agent, or Firm—Wood, Dalton, Phillips, Mason & Rowe

[57] ABSTRACT

A tube having a plurality of hydraulically parallel fluid passages for use in a heat exchanger can be made by forming an elongated, undulating insert and disposing the same within a flattened tube. A noncorrosive brazing flux is adhered to at least one of the interior of the tube and the crests on the undulating insert. Braze alloy is also located at the interface of the crests of the insert and the interior wall of the tube. Thereafter, the insert is located within the tube without disturbing the flux and the tube deformed along its length to bring the interior of the tube into contact with the crests on the insert. The assembled tube and insert construction is then heated to braze joints between the interior wall of the tube and the crests of the insert along the entire length of the latter.

8 Claims, 6 Drawing Figures

METHOD OF MAKING A HEAT EXCHANGER

CROSS REFERENCE

This application is a continuation-in-part of our co-pending, commonly assigned application Ser. No. 835,637 filed Mar. 3, 1986, and entitled "Method of Making a Heat Exchanger," now abandoned.

FIELD OF THE INVENTION

This invention relates to heat exchangers, and more particularly, to heat exchangers of the type utilizing a plurality of parallel fluid passages as, for example, on the fluid side. Though not limited thereto, the invention may be utilized with efficacy in the making of condensers.

BACKGROUND OF THE INVENTION

Many heat exchangers employed in air conditioning or refrigeration systems utilize one or more serpentine conduits on the refrigerant side. In order to prevent the existence of an overly high pressure differential from the vapor inlet to the condensate outlet, which would necessarily require increased energy expenditure in operating the system, the flow passages within such tubes are of relatively large size to avoid high resistance to fluid flow.

As a consequence, the air side of the tubes must be expanded in order to accommodate the relatively large flow passages and this in turn results in a structure wherein a relatively large portion of the frontal area of the air side of the heat exchanger is blocked by the tube with a lesser area available in which air side fins may be disposed to enhance heat transfer.

In order to maintain a desired rate of heat transfer, the air side pressure drop becomes undesirably large and, in turn, results in a commensurately undesirable large system energy requirement in moving the necessary volume of air. To avoid certain of the foregoing problems, it has been proposed to utilize a plurality of parallel tubes extending between between headers with each of the tubes defining a plurality of parallel flow paths within its innards. This allows the use of relatively small individual passages which in turn reduces the percentage of the total frontal area of the device occupied by the tubes.

However, forming tubes to contain a plurality of parallel flow paths has presented a number of difficulties, particularly where the flow paths are intended to have an unusually small hydraulic diameter. Economical extrusion techniques have not yet been developed and where inserts are utilized to subdivide the interior of the tube, difficulty has been met in maintaining the structural integrity of the assemblage to prevent tube rupture at conventional operating pressures as well as to prevent cross flow within the tube between the adjacent flow passages defined by the insert.

The present invention is directed to overcoming one or more of the above problems.

SUMMARY OF THE INVENTION

It is the principal object of the invention to provide a new and improved heat exchanger. More specifically, it is an object of the invention to provide a tube for a heat exchanger which contains an insert which in turn subdivides the tube interior into a plurality of parallel flow passages and which strengthens the tube against rupture from internal pressurization and which avoids cross flow between the flow passages within the tube.

The foregoing object is accomplished in a method which includes the steps of: (a) providing a flattened tube having an interior defined by a wall; (b) forming an elongated insert of slightly lesser size than the interior of the tube, the insert having a plurality of oppositely directed crests separated by oppositely opening valleys sufficiently proximate to each other that, when the insert is placed in the tube, each valley and the adjacent interior wall of the tube will define an elongated passage through the tube; (c) adhering a brazing flux and a braze alloy to at least one of the interior of the tube and the crests; (d) inserting the insert into the tube without disturbing the flux; (e) bringing the interior wall into contact with the crests; (f) heating the assembled tube and insert to a temperature above the melting point of the braze alloy to braze the crests to the interior wall; and (g) thereafter cooling the assembled tube and insert.

According to a preferred embodiment of the invention, the adhering of the braze alloy is performed prior to the adhering of the brazing flux and constitutes the cladding of one or the other or both of the interior of the tube and the crests with braze alloy.

A highly preferred embodiment of the invention contemplates that step (d) be performed by inserting projections into the valleys of the insert on opposite sides thereof and clamping the insert between such projections without contacting the crests. Thereafter, relative axial movement is effected between the insert and the tube to cause the insert to be inserted within the tube.

The invention contemplates that the projections be generally parallel, continuous, peripheral surfaces on wheels, one wheel being on each side of the insert. Relative movement to effect the actual introduction of the insert into the tube is effected by rotating the wheels.

The invention may be used with particular efficacy where the flow passages are to be of relatively small hydraulic diameter as, for example, 0.07 inches or less. When such a dimension is selected, particularly where the hydraulic diameter is 0.04 inches or less, the structure is ideal for utilization in a high efficiency condenser. For example, in such respect, the invention contemplates the additional steps of assemblying a plurality of the tube and insert structure resulting from step (e) in generally parallel relation and disposing fins between the exterior surfaces of such tubes. The additional steps are performed prior to the performance of step (f) such that step (f) results in the brazing together of the various components to form a heat exchanger core.

Though not limited thereto, the invention is particularly useful in forming aluminum heat exchangers.

Other objects and advantages will become apparent from the following specification taken in connection with the accompanying drawings.

DESCRIPTION OF THE PREFERRED EMBODIMENT

Figure 1:
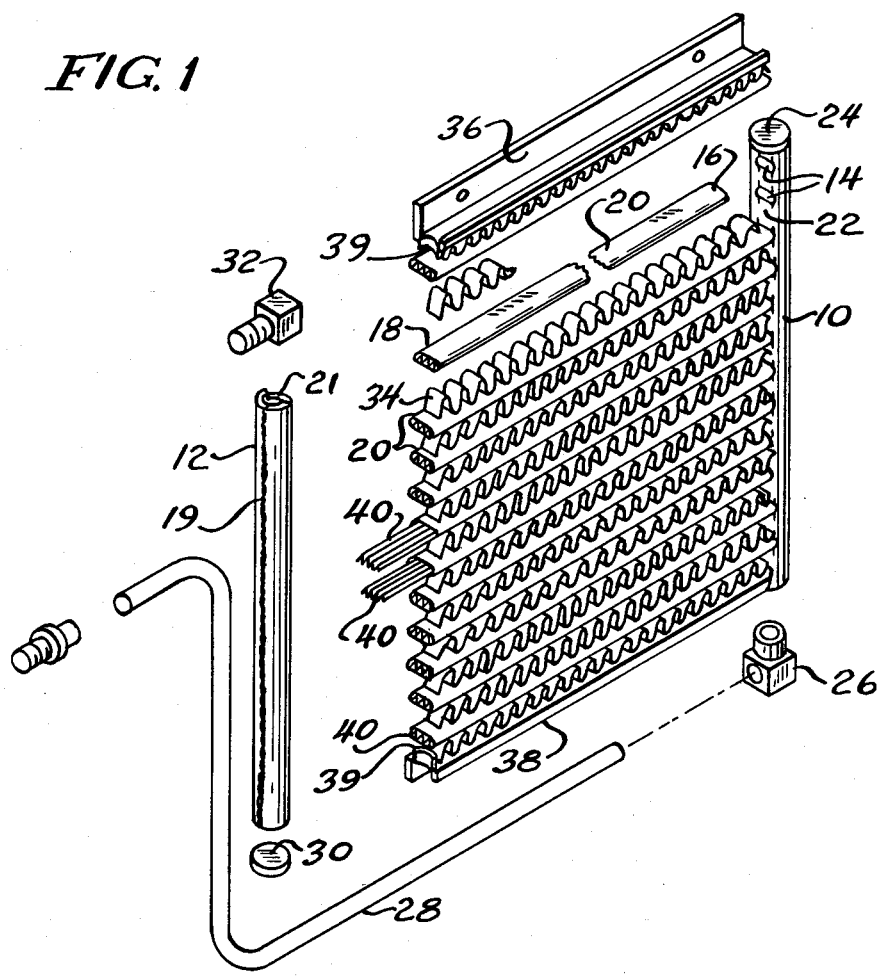
FIG. 1 is a partially exploded view of a heat exchanger, specifically, a condenser, made according to the invention.

An exemplary embodiment of a heat exchanger made according to the invention is illustrated in FIG. 1 in the form of a condenser. However, it is to be understood that the invention may be employed with efficacy in the manufacture of other heat exchangers of the type wherein a spacer or insert is disposed within a tube for the purpose of subdividing it into a plurality of parallel flow paths or for structurally reinforcing the tube against rupture as a result of excessive internal pressure.

As seen in the drawing, the condenser includes opposed, spaced, generally parallel headers 10 and 12. The headers 10 to 12 are preferably made up from generally cylindrical tubing. On their facing sides, they are provided with a series of generally parallel slots or openings 14 and 18 for the receipt of corresponding ends 16 and 18 of condenser tubes 20. The header tubes 10 and 12 are preferably welded and thus include a weld seam as shown at 19 in connection with the tube 12. Oppositely of the weld seam 19, each end of each of the headers is notched as shown at 21 in connection with the header 12. The notch 21 serves as an orientation notch during manufacture. The slots 14 are punched on the sides of the headers 10 and 12 having the notch 21 so that the weld bead 19 is avoided during the punching process.

Preferably, between the slots 14, in the area shown at 22, each of the headers 10 and 12 is provided with a somewhat spherical dome to improve resistance to pressure is more fully in the commonly assigned, copending application of Saperstein et al, entitled "Heat Exchanger" application Ser. No. 722,653, filed Apr. 12, 1985, the details of which are herein incorporated by reference.

The header 10 has one end closed by a cap 24 brazed or welded thereto. In the preferred embodiment of the invention, the various components are all brazed together and accordingly, in the usual case, brazing will be the means employed to fasten the cap 24 to the header 10. Similarly, fittings such as the fitting 26 are brazed to other components and a tube 28 may be connected to the fitting 26 to define an outlet for the condenser.

The lower end of the header 12 is closed by a cap 30, preferably brazed in place similarly to the cap 24, while the upper end of the header 12 is provided with a welded or brazed in place fitting 32. Typically, the fitting 32 will serve as an inlet although flow direction may be reversed in some instances.

A plurality of the tubes 20 extend between the headers 10 and 12 and are in fluid communication therewith. The tubes 20 are geometrically in parallel with each other and hydraulically in parallel as well. Disposed between adjacent ones of the tubes 20 are serpentine fins 34 although plate fins could be used if desired. Upper and lower side channels 36 and 38 extend between the headers 10 and 2 to provide rigidity to the system. Each end of each of the channels 36 and 38 include an outturned flange 39 of semi-arcuate construction which is adapted to be bonded to the adjacent header 10 or 12.

As can be seen in FIG. 1, each of the tubes 20 is a flattened tube and within its interior includes an undulating spacer or insert 40 of elongate construction.

Figure 2:
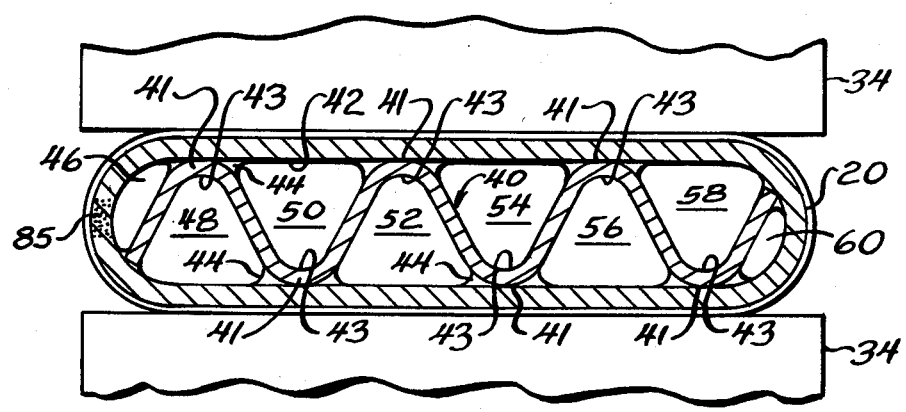
FIG. 2 is an enlarged, fragmentary sectional view of a tube with inset and adjacent fins employed in the heat exchanger.

In cross section, the insert 40 appears as illustrated in FIG. 2 and it will be seen that there are alternating crests 41 of the insert extending to opposite sides which are in contact with the interior wall 42 of the tube 20. Oppositely of each of the crests 41 are valleys 43 which serve to separate adjacent crests 41 extending in the same direction. The crests 41 are bonded to the interior wall 42 of the tube 20 by fillets 44 of braze metal. As a consequence, a plurality of hydraulically parallel fluid flow paths 46, 48, 50, 52, 54, 56, 58 and 60 are provided within each of the tubes 20. Depending upon design desires, a greater or a lesser number of the flow paths could be utilized.

Though the invention is not limited thereto, preferably, each of the flow paths 48, 50, 52, 54, 56 and 58, and to the extent possible depending upon the shape of the insert 40, the flow paths 46 and 60 as well, have a hydraulic diameter in the range of about 0.015 to about 0.07, and preferably, only to about 0.04 inches. Hydraulic diameter is as conventionally defined, namely, the cross-sectional area of each of the flow paths multiplied by four and in turn divided by the wetted perimeter of the corresponding flow path. Within that range, it is desirable to make the tube dimension across the direction of air flow through the core as small as possible. This in turn will provide more frontal area in which fins, such as the fins 34 may be disposed in the core without adversely increasing air side pressure drop to obtain a better rate of heat transfer.

The foregoing and other advantages o7f a heat exchanger are expounded upon in greater detail in the commonly assigned, copending application of Guntly, filed Oct. 2, 1985, application Ser. No. 783,087 and entitled "Condenser With Small Hydraulic Diameter Flow Path", the details of which are herein incorporated by reference.

Figure 3A:
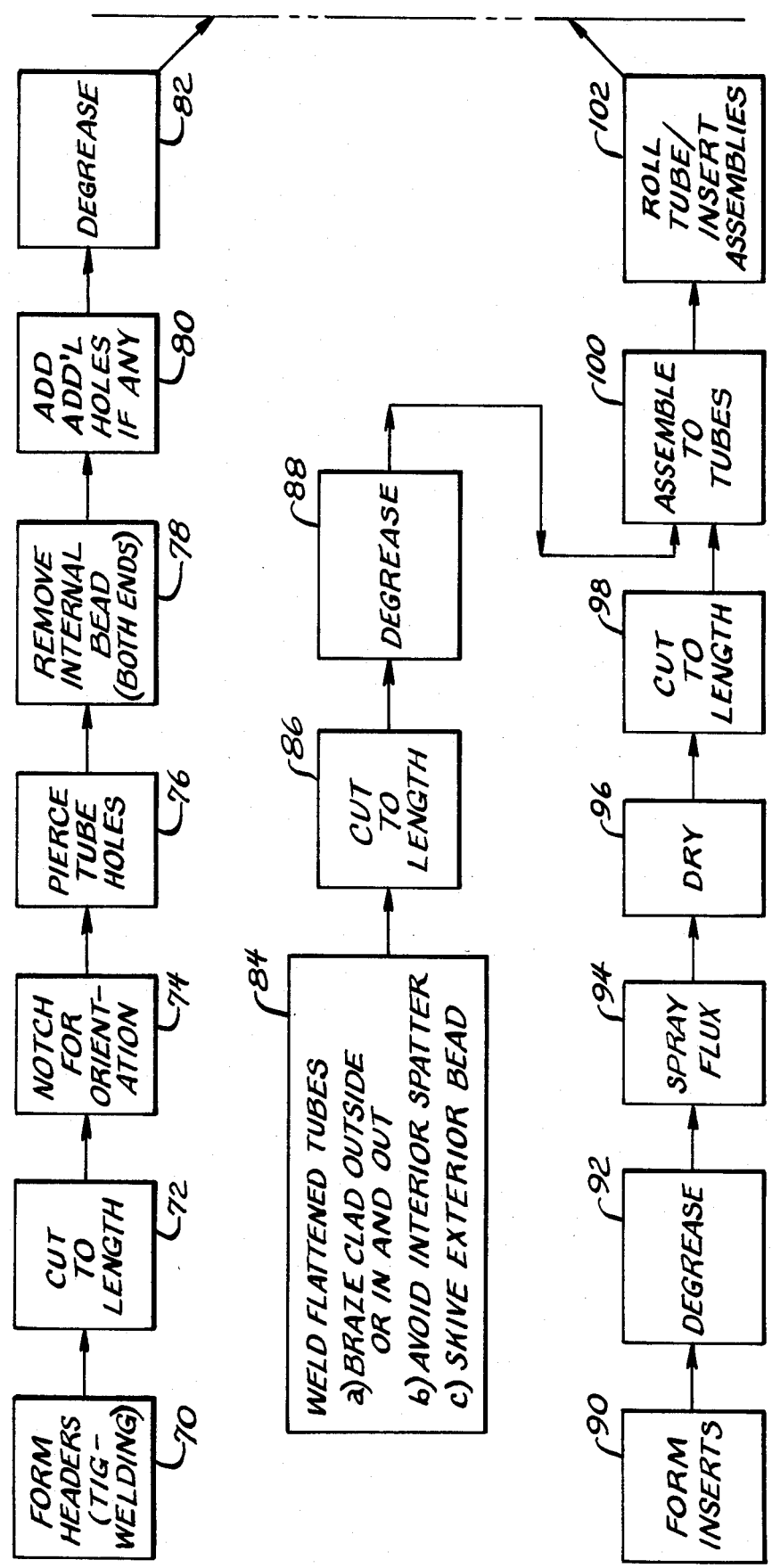
FIG. 3 is composed of FIGS. 3A and 3B, the latter to be placed to the right of the former, illustrating a flow diagram for a preferred embodiment of the method of the invention.
Figure 3B:
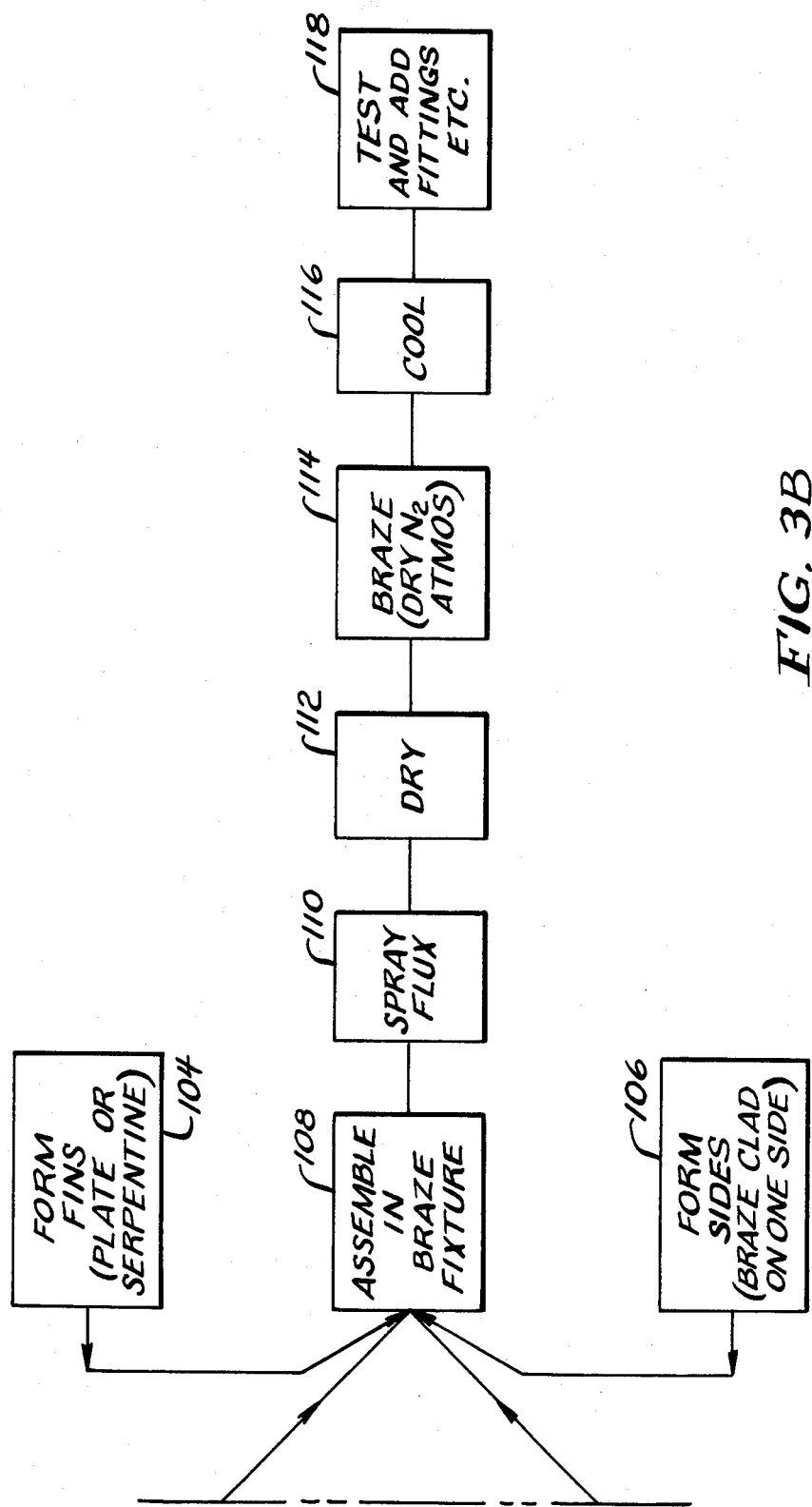

Turning now to FIGS. 3A and 3B, an exemplary embodiment of the method of manufacture according to the invention is illustrated in block form. Looking first at the formation of the headers 10 and 12, a first step 70 is the formation of the header tubes. This is typically performed on conventional tube forming equipment employing tungsten, inert gas welding. The resulting tubes are then cut to length as shown at 72 and, as shown at 74, provided with the notches 21 for orientation. The tube holes 14 are then formed as shown at block 76 and this is followed by removal of the internal weld bead of the weld 19 at both ends of each of the headers 10 and 12. This step is shown at 78 and generally only requires removal of the bead within the interior ½ inch nearest the end of the tube. Alternatively, the steps 76 and 78 may be reversed.

Should it be necessary to form any additional holes in either the header 10 or the header 12 as, for example, to receive fittings other than those shown at 26 or 32, such holes are then formed as shown at block 80.

In the usual case, the tube will be formed at block 70 on a conventional tube mill using a water base coolant as well as a lubricant. Thus, within one day of the formation of the tube, the same should be degreased and such a step is shown at 82. It is preferred to use a so-called "aggressive" Freon ® based degreasing fluid. By use of the term "aggressive" it is meant that the degreasing fluid is capable of displacing and/or absorbing up water and lubrication in the tube metal itself or in any oxide layer formed thereon without reacting with the tube metal.

FIG. 3A also illustrates the steps of forming the tubes 20. As illustrated at block 84, the flattened tubes 20 are formed by welding. This is accomplished using a stock which is clad with braze alloy on the outside if the insert 40 is braze clad. If the insert 40 is not braze clad, the tube stock will be braze clad both inside and outside.

In the process of forming the welded flattened tubes, the weld, shown at 85 in FIG. 2, is formed on the radius of the tubes so it will not interfere with the bonding of the fins 34 to the sides of the tube 20.

Because an insert is ultimately to be disposed within the tubes, the step represented by block 84 is performed taking conventional precautions to avoid any interior weld spatter within the tube. Finally, each tube 20 has any exterior weld bead skived. The skiving of the exterior bead at the weld 21 is performed so that the tube 20 can be inserted in the corresponding openings 14 within the headers 10 and 12.

According to the preferred embodiment, the internal dimension of the tube 20 is formed something on the order of 0.022 inches larger than the corresponding dimension of the insert 40. This allows the insert 40 to be disposed within the tube 20 relatively easily.

Following these operations, the tube 20 is then cut to length as represented by block 86 and subsequently degreased as shown at block 88. This step may be substantially identical to the steps shown at block 82 and the same constraints apply.

FIG. 3A also illustrates the formation of the inserts 40. The basic formation is illustrated at at block 90. The stock employed may be bare of braze alloy cladding if the interior of the tubes 20 is clad. Alternatively, if the interior of the tubes 20 is not clad, the stock of which the inserts 40 is formed will be braze clad on both sides.

In a preferred embodiment, the undulations in the insert will be formed by rolling, generally through a succession of rolls wherein undulations are added as each set of rolls are passed. Alternatively, the inserts may be formed to a fixed length by rolling, by die forming or even extrusion.

The forming of the inserts is then followed by a degreasing step shown at block 92 which may be similar to or identical to the degreasing steps mentioned previously. Of course, it will be appreciated that the degreasing step shown at block 92 is only necessary in the event a lubricant is utilized in the forming step shown at 90 and then, only when the lubricant utilized is one that is incompatible with subsequent brazing.

After the inserts 40 have been degreased, flux is applied as shown at the block labeled 94. According to a preferred embodiment, the flux is applied by spraying and the flux utilized must be such as to adhere to the substrate, here the inserts.

Although it is always desirable, where small hydraulic diameter flow passages are being formed it is highly preferred that the flux be noncorrosive. By "noncorrosive" it is meant that the flux, when in its dormant state or when present as a post brazing residue, is noncorrosive. If a corrosive flux is used, the excess flux must be washed away to prevent corrosion. Because of the small hydraulic diameter of the passages, such washing will be essentially impossible and certainly impossible on an economic basis.

There are various types of noncorrosive fluxes and frequently, but not always, they are both nonhydroscopic and nonhydrated. Where the insert 40 and tubes 20 are formed of aluminum, the flux may be a typical flux utilized in processes licensed under the trademark Nocolok. Fluxes of this sort, which are both nonhydroscopic and nonhydrated, are described in U.S. Pat. No. 3,951,328 issued Apr. 20, 1976, to Wallace et al, the details of which are herein incorporated by reference. Additionally, both the hydrated and nonhydrated fluxes described in U.S. Pat. No. 4,579,605, issued Apr. 1, 1986, to Kawase et al, the details of which are herein incorporated by reference, may be used. Preferably, the flux is contained in a water suspension which constitutes 25% flux by weight.

Alternatively, the flux may be applied by dipping or by electrostatic deposition. Further, if the assembly is to be made by vacuum brazing, flux application may be omitted entirely.

If the application of the flux includes a water carrier, the inserts are dried in, for example, a hot air tunnel as shown at step 96. The steps shown at 94 and 96 are such that a residue of flux remains on the insert in an amount equal to 5 grams per square meter of insert surface area.

Following the drying of the inserts, the same are cut to length as illustrated at a block 98. Generally speaking, the inserts will be cut slightly shorter than the length of the tubes resulting from the step 86 since the inserts have a tendency to grow in their elongated direction during subsequent operation.

The inserts resulting from the step 98 and the tube sections resulting from the step 88 are then assembled by axially inserting the inserts into the tubes as shown at block 100. The precise manner in which the step represented by the block 100 is accomplished will be described in greater detail hereinafter.

Following the assembly step 100, the assembly is passed through opposed rollers which act to bring the internal dimension of the tube into contact with the insert crests. Alternatively, the same result can be achieved through so-called "spanking". This step is represented by block 102 and it is noted that lubrication is not utilized during the rolling process.

Other preliminary formation steps are illustrated in FIG. 3B. For example, a block 104 schematically illustrates the formation of the fins 34. While the fins 34 are shown as being serpentine fins, plate fins can likewise be used. Cladding of the stock of which the fins are formed is not necessary as the exterior of the tubes 20 is clad to thereby provide available braze metal in subsequent steps. The channels or side members 36 and 38 are also formed by appropriate means as illustrated by the block 106. These elements have braze cladding on one side, namely, the side that faces the fins 34.

The fins, the headers, the tubes with the inserts in place and the sides resulting respectively from the steps 104, 82, 102 and 106 are then assembled together in any suitable braze fixture as illustrated at step 108. The assembly is then sprayed with flux as shown at step 110. The same flux utilized in the step illustrated at 94 may be employed here.

A flux drying step shown at 112 follows and the steps 110 and 112 are such that a residue of two to five grams per square meter of surface area of core is present.

A so-called "Nocolok®" brazing process is then performed in a brazing furnace under a dry nitrogen atmosphere as illustrated at 114. Subsequently, the core is cooled as shown at block 116 and then pressure tested as shown at 118 and fittings added.

Figure 4:
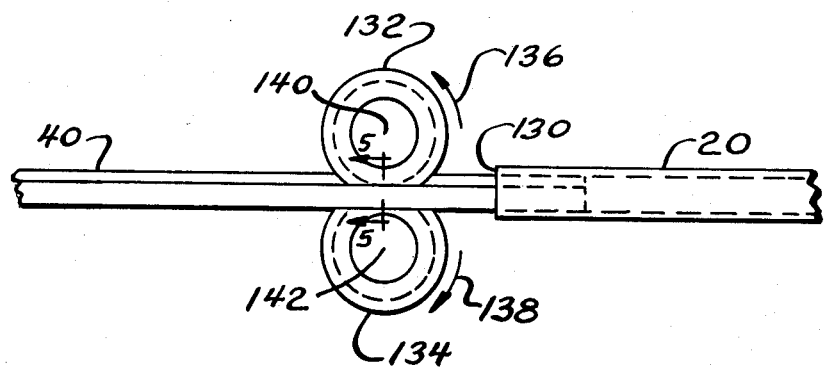
FIG. 4 is an elevational view of the assembly of an insert to a tube.
Figure 5:
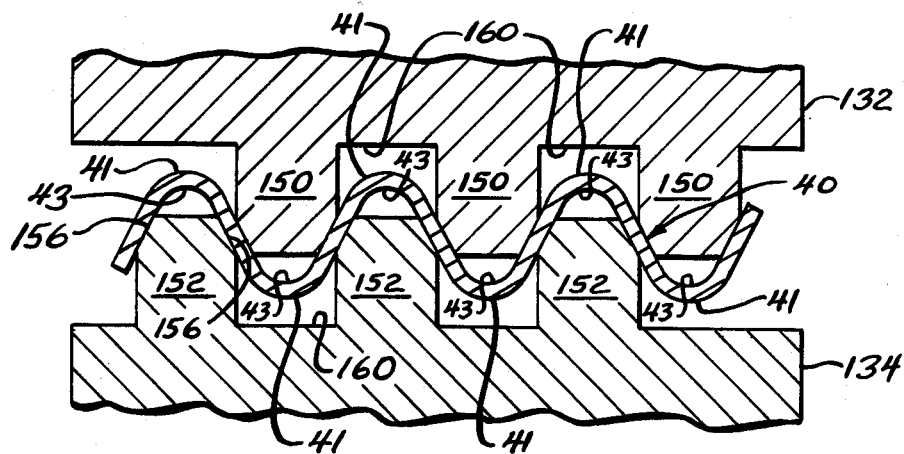
FIG. 5 is an enlarged sectional view taken approximately along the line 5—5 in FIG. 4.

Returning to the step 100, it is important that during the step of inserting the inserts 40 within the tubes 20, that the flux at the crests 41 on the inserts not be disturbed. While contact between the crests 41 and the interior 42 of the tube 20 cannot be avoided during the insertion process, inadvertant removal of flux from the crests 41 at other times is definitely to be avoided. Figs. 4 and 5 illustrate one means for insert assembly without flux loss. In particular, in assemblying the insert 40 to a tube 20, the tube 20 is held stationary by any suitable means and the insert 40 axially inserted into one end 130 of the tube 20. The inserting force is provided by engaging opposite sides of the insert 40 with rollers 132 and 134 driven in the direction of arrows 136 and 138 respectively by any suitable means about parallel axes 140 and 142. The rollers 132 and 134 clampingly engage the insert and provide enough driving force to overcome such friction as may exist as the insert enters the interior of a tube 20.

To avoid disturbing flux at the crests 41, the peripheral surfaces of the rollers 132 and 134 are uniquely configured. In particular, each of the rolls 132 and 134 has a series of peripheral, continuous projections 150 and 152 respectively. The projections 152 terminate in annular tapered surfaces 156 as illustrated in FIG. 5 and the spacing of the projections 150 with respect to each other is such as to cause the same to be in alignment with adjacent ones of the upwardly opening valleys 40 between the crests 41. The projections 152 are staggered with respect to the projections 150 and the staggering is such that the projections 152 enter the downwardly opening valleys 43 on the insert 40. Each of the projections 150 and 152 is separated from the adjacent projection 150 or 152 by a groove 160 of sufficient width and of sufficient depth so that the corresponding crest 41 may enter the same without being contacted by any part of the corresponding roll 132 or 134.

As a consequence of the foregoing, the projections 150 and 152 serve to clampingly engage an insert 40 without contacting the crests 41. The clamping force is such that when combined with the direction of rotation represented by the arrows 136 and 138, the rollers will frictionally drive an insert 40 into a tube 20 without disturbing the flux adhering to the crests 41. This step, together with the rolling or spanking step illustrated at block 102 in FIG. 3A which brings the interior wall 42 of the tube 20 into contact with all of the crests 41 assures that an excellent bond will be achieved along the entire length of each of the crests 41.

This, in turn, means that there will be no cross flow between adjacent ones of the flow passages 46, 48, 50, 52, 54, 56, 58 and 60 because a brazed, fluid impervious joint will be present at the interface of each crest 41 and the wall 42. It also means that the tube will be extremely resistant to rupture as a result of pressure applied to the interior of the tube. Because the tube is not circular, it will lack hoop strength and will not be as strong for resistance to rupture as an otherwise identical tube of cylindrical cross section. However, the presence of the insert 40 along with the bonds at the crests 41 to the interior walls 42 convey loading against the interior wall 42 of the tube 20 to the various webs of the insert which are placed in tension to resist rupture.

In this respect, the obtaining of a uniform bond along the length of each of the crests 41 is significant since if there were no bond for a short length of any given one of the crests 41, in a serpentine fin heat exchanger, the tube wall at such location would be free to deform outwardly since there was no bond. This in turn would result in the load at such location being placed on the bond at the two adjacent crests 41. This could in turn mean that each such bond at the adjacent crests be overloaded by as much as 50% which in turn could lead to their failure and an ultimate rupturing of the tubes and destruction of the heat exchanger.

In the case of the use of plate fins, the need for such a uniform bond along the length of each of the crests 41 is not as important since, as is well known, plate fins are significantly more resistant to compressive failure than serpentine fins, and thus resist outward deformation of the tube to prevent such rupture.

It should be recognized that while the inserts 40 have been described in connection with condensers and the prevention of cross-flow, in some instances the inserts, rather than being imperforate, could be perforate. An example would be when the tube and insert structure is being used in an oil cooler. In this environment, a perforate insert would serve as an excellent turbulator.

From the foregoing, it will be appreciated that a method according to the invention is ideally suited for the formation of tubes each having a plurality of parallel flow passages. The method is particularly well suited for making tubes having flow passages of extremely small hydraulic diameter which, as noted previously, have highly desirable qualities in terms of enhanced performance when employed in condensers.

We claim:

1. A method of making a heat exchanger having a plurality of side-by-side fluid passages each of a hydraulic diameter of about 0.07 inches or less comprising the steps of;
    (a) providing a flattened tube;
    (b) forming an elongated, undulating in cross-section, insert of slightly lesser size than the interior of said tube, said insert having a plurality of crests separated by valleys and sufficiently proximate to each other that, when the insert is placed in the tube, each valley and the adjacent interior wall of the tube will define an elongated passage through the tube having a hydraulic diameter of about 0.07 inches or less, at least one of the interior of said tube and said crests being clad with braze alloy;
    (c) adhering a noncorrosive brazing flux to at least one of the interior of said tube and said crests;
    (d) inserting said insert into said tube without disturbing said flux;
    (e) deforming said tube along its length to bring said interior into contact with said crests;
    (f) heating the assembled tube and insert to a temperature above the melting point of the braze alloy to braze the crests to said interior; and
    (g) thereafter cooling the assembled tube and insert.

2. A method of making a heat exchanger having a plurality of side-by-side fluid passages each of a hydraulic diameter of about 0.07 inches or less comprising the steps of:
    (a) providing a flattened aluminum tube;
    (b) forming an elongated aluminum insert of slightly lesser size than the interior of said tube, said insert having a plurality of elongated ridges separated by elongated voids sufficiently proximate to each other that, when the insert is placed in the tube, each void and the adjacent interior of the tube will define an elongated passage through the tube having a hydraulic diameter of about 0.07 inches or less, at least one of the interior of said tube and said ridges being clad with braze alloy;

(c) adhering a noncorrosive brazing flux to at least one of the interior of said tube and said ridges;
(d) inserting said insert into said tube without disturbing said flux;
(e) sqeezing said tube along its length to bring said interior into contact with said ridges;
(f) heating the assembled tube and insert to a temperature above the melting point of the braze alloy to braze the ridges to said interior; and
(g) thereafter cooling the assembled tube and insert.

3. A method of making a heat exchanger having a plurality of side-by-side fluid passages each of a hydraulic diameter of about 0.07 inches or less comprising the steps of:
(a) providing an elongated flattened tube;
(b) forming an elongated insert of slightly lesser size than the interior of said tube, said insert having a plurality of crests separated by valleys and sufficiently proximate to each other that, when the insert is placed in the tube, each valley and the adjacent interior wall of the tube will define an elongated passage through the tube having a hydraulic diameter of about 0.07 inches or less, at least one of the interior wall of said tube and said crests being clad with braze alloy;
(c) adhering a noncorrosive brazing flux to at least one of the interior wall of said tube and said crests;
(d) inserting said insert into said tube without disturbing said flux;
(e) squeezing said tube against said insert to bring said interior wall into contact with said crests along substantially their entire lengths;
(f) heating the assembled tube and insert to a temperature above the melting point of the braze alloy to braze the crests to said interior wall; and
(g) thereafter cooling the assembled tube and insert.

4. The method of claim 3 including the additional steps of assembling a plurality of the tube and insert structures resulting from step (e) in generally parallel relation, and disposing fins between the exterior of the tubes; said additional steps being performed prior to the performance of step (f).

5. A method of making a heat exchanger having a plurality of side-by-side fluid passages comprising the steps of:
(a) providing a flattened tube having an interior defined by a wall:
(b) forming an elongated insert of slightly lesser size than the interior of said tube, said insert having a plurality of oppositely directed crests separated by oppositely opening valleys sufficiently proximate to each other that, when the insert is placed in the tube, each valley and the adjacent interior wall of the tube will define an elongated passage through the tube;
(c) adhering a brazing flux and a braze alloy to at least one of the interior of said tube and said crests;
(d) inserting said insert into said tube without disturbing said flux;
(e) bringing said interior wall into contact with said crests;
(f) heating the assembled tube and insert to a temperature above the melting point of the braze alloy to braze the crests to said interior wall; and
(g) thereafter cooling the assembled tube and insert.

6. The method of claim 5 wherein the adhering of a brazing alloy is performed prior to the adhering of a brazing flux and constitutes the cladding of said one of the interior of said tube and said crests.

7. The method of claim 5 wherein step (d) is performed by inserting projections into said valleys on opposite sides of said insert, clamping said insert between said projections without contacting said crests and effecting relative axial movement between said insert and said tube.

8. The method of claim 7 wherein said projections are generally parallel, continuous peripheral surfaces on rollers, one on each side of said insert and said relative movement is effected by rotating said rollers.

* * * * *